United States Patent Office 3,306,446
Patented Feb. 28, 1967

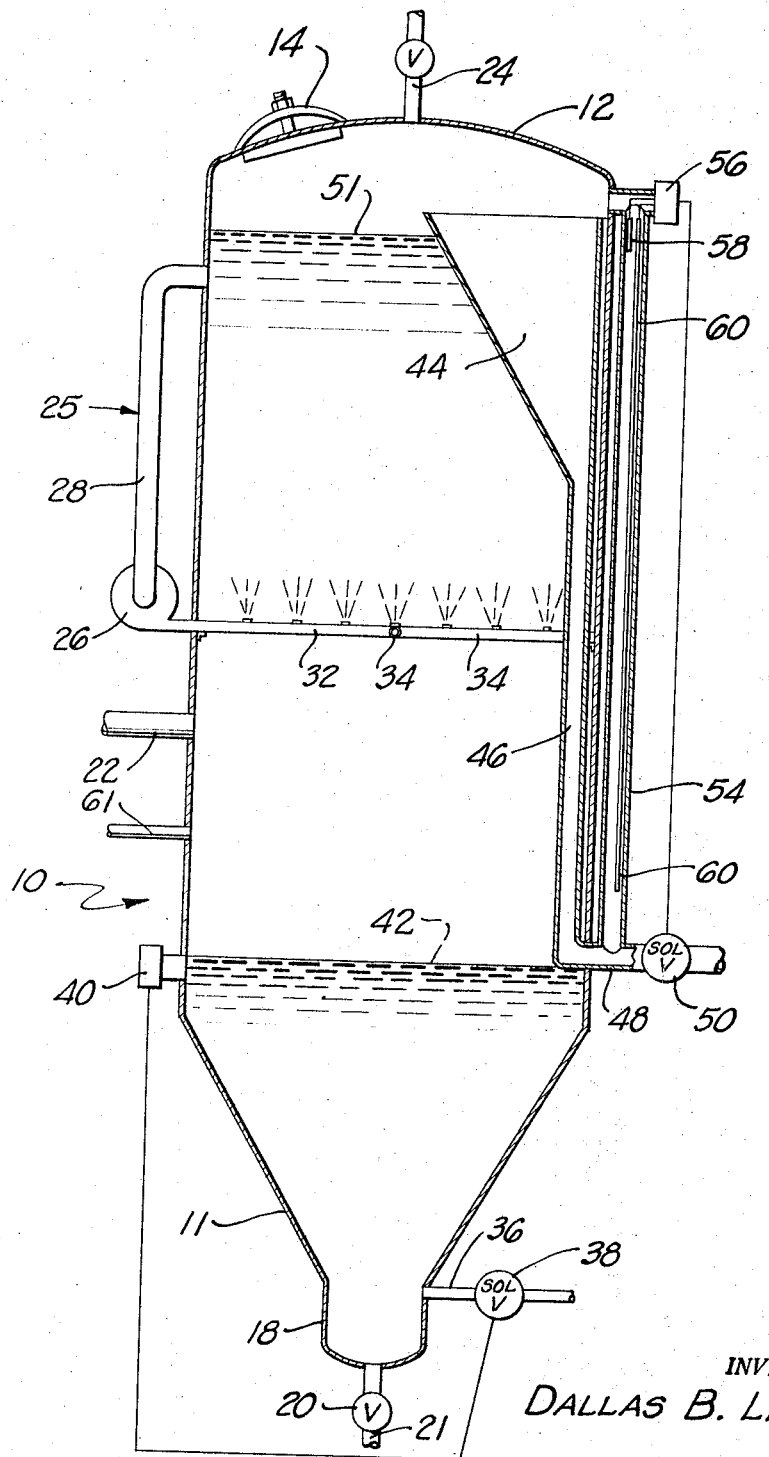

3,306,446
MULTIPHASE SEPARATOR
Dallas B. Lewis, 2015 Whitley Ave., Hollywood, Calif. 90028; Lucille Parker, Jack Heidt, and Robert Gaston, executors of said Dallas B. Lewis, deceased
Filed Oct. 4, 1963, Ser. No. 313,830
2 Claims. (Cl. 210—114)

This invention relates to the separation of a stream having at least three phases; for example, two liquid phases and a liquid or solid third phase which in a gravity separation tends to form an intermediate layer between the two liquid phases.

In some industrial separations, the operation is necessarily carried on at an elevated temperature and superatmospheric pressure because of the necessity of maintaining one or more of the phases in a liquid state. A typical separation of this type occurs in the processing of sulfur-containing ore. Sulfur has a melting point of approximately 120° C. Hot water and steam at temperatures in excess of 120° C. and pressures usually in the range of 15–30 p.s.i. are used for the separation of the sulfur from its ore. There is an initial separation which removes most of the gangue but the sulfur and hot water stream from the initial separation still contains some gangue or solid material. The gangue dispersed in the hot water-sulfur stream may have a particle size of face powder.

It is a primary object of this invention to provide an improved apparatus for the separation of a solid phase and a first liquid phase from a second liquid phase of a normally solid material.

A still further object of this invention is to provide an apparatus for separation of a stream having at least three phases whereby one of the phases is removed from a lower portion of the separation zone and the other two phases are maintained intermixed and removed from an upper portion of the separation zone.

A still further object of the invention is to provide an apparatus for separating molten sulfur from an aqueous stream containing a third phase, in which apparatus the molten sulfur is removed from a bottom portion of the separation zone and the other two phases are intermixed and removed from an upper portion of the zone.

A still further object of the invention is to provide an apparatus designed for the separation of a stream having at least three phases wherein one of the phases is removed from the bottom of the apparatus and the other two phases are maintained intermixed and periodically removed from an upper portion of the vessel.

These and other objects and advantages of the invention will become more apparent in the following description, taken in conjunction with the drawing which comprises a single figure illustrating a preferred apparatus for the practice of the invention.

There is illustrated in the drawing a closed cylindrical upright vessel 10 having a slightly domed top 12 which is provided with a manhole 14. The lower end or bottom of the vessel 10 is conical with the smaller end of the inverted cone terminating in a small-diameter catch basin 18. The catch basin may be occasionally cleaned out by opening a valve 20 in a discharge line 21.

The stream being separated is introduced to an intermediate level of the vessel 10 through an in-line 22. Gas collecting in the overhead of the vessel 10 may be removed via a gas removal line 24 which connects to the domed top 12.

The upper portion of the separation zone defined by the vessel 10 of the invention incorporates a circulating system 25 including a pump 26 and a conduit means 28 for removing liquid from an upper level of the upper portion of the vessel and for returning the removed liquid to a lower level of the upper portion. The recirculated liquid is discharged into the vessel by an upwardly directed spray means 32. The spray means 32 comprises two cross arms 34 which are set at a right angle to each other above the in-line 22.

Means are provided for periodically and separately removing liquid from the conical bottom 11 of the vessel 10 and from the upper portion of the vessel. A withdrawal line 36 connects into the lower end of the vessel 10 at the juncture of the conical bottom 11 and the catch basin 18. The withdrawal line 36 is provided with a solenoid operated valve 38 whose opening and closing are regulated by a valve control switch 40 of a conventional type which is sensitive to a predetermined viscosity at a level or interface 42 within the vessel 10. When the molten sulfur or other materials collecting in the conical bottom 11 reach the level 42, the valve control switch 40 activates the solenoid of the valve 38 causing the valve to open to the flow of molten sulfur through the withdrawal line 36. The valve control switch 40 is provided with a time control which provides a signal to the solenoid closing the valve 38 when the level of the molten sulfur approaches the level of the withdrawal pipe 36.

The means for separately removing liquid from the upper portion of the vessel 10 comprises an enlarged funnel-shaped compartment 44 disposed within the vessel with its open upper end close to but removed from the top 12 of the vessel. Compartment 44 has a downwardly extending leg 46 of reduced cross section which at its lower end opens through a lateral exit line 48 and a solenoid operated valve 50 to the exterior of the vessel.

At or near the interface 42, the heavy liquid phase therebelow is separated from the adjacent multiphase thereabove. Above or near an interface 51 the light liquid phase is separated from the adjacent multiphase therebelow.

A standpipe 54 placed externally of the vessel 10 with its lower end opening into the exit line 48 parallels the length of the funnel compartment 44 including the leg 46. The upper end of the standpipe 54 connects into the head space of the vessel immediately above the upper edge of the funnel compartment 44. A floatless liquid level control 56 of the conventional electrode type is located adjacent the upper end of the standpipe 54 and is provided with two electrodes 58 and 60 which are disposed within the confines of the standpipe 54. The level control 56 is connected to the solenoid valve 50 and provides signals for the opening and closing of that valve. It will be seen that the shorter one 58 of the two electrodes reaches only a short distance down into the upper end of the standpipe 54. The longer one 60 of the electrodes reaches nearly to the juncture of the standpipe 54 and the exit line 48. The level control 56 opens the solenoid valve 50 when the level of the liquid in the standpipe 54 and the funnel compartment 44 reaches the lower end of the shorter electrode 58. The valve 50 remains open to permit the emptying of the funnel compartment 44 through the exit line 48 until the liquid within the funnel leg 46 and the standpipe 54 reaches the lower end of the longer electrode 60 at which time the valve 50 closes.

It will be seen that the vessel 10 and its controls 40 and 56 are designed to avoid opening of the vessel to atomspheric pressure during the removal of liquid either from the upper or lower end of the vessel. By providing the recirculation system 25 including the pump 26, conduit means 28, and spray means 32, it is possible to employ a single exit line for removal of two phases of the entering stream. The particular design of the vessel 10 of the invention including the provision of a steam line 61, permits the maintaining of the vessel under the elevated pressure and high temperature required for holding of the sulfur in its molten state. The steam line 61 opens into the vessel 10 beneath the stream inlet line 22. Sufficient steam is supplied to raise the temperature of the sulfur to at least 120° C. This location of the steam line 61 helps to agitate the contents of the vessel 10.

The separator vessel 10 of the invention is particularly suitable for the recovery of molten sulfur from an aqueous stream containing fine silica and other gangue particles. The molten sulfur of the entering stream separates and settles to fill the conical bottom 11. The gangue particles in the absence of agitation would tend to form an intermediate layer between the sulfur and overlying water. The circulating system 25 maintains the gangue intermixed with the water. The gangue and water are removed jointly through the funnel compartment 44 and exit line 48.

The gangue particles have a somewhat greater specific gravity than the molten sulfur, but the sedimentation rate of the gangue is considerably slower. The gangue particles exhibit considerable buoyancy, probably because of their characteristic shapes and small size which may approximate the particle size of face powder. The molten sulfur provides considerable frictional resistance to the downward settling of the gangue particles.

Although an exemplary embodiment of the invention has been disclosed herein for purposes of illustration, it will be understood that various changes, modifications, and substitutions may be incorporated in such embodiment without departing from the spirit of the invention as defined by the claims which follow:

I claim:
1. A separating apparatus for a multiphase stream comprising:
   a vessel;
   means for introducing the multiphase stream to an intermediate level of said vessel;
   means on said vessel for agitating at least two phases of said stream to maintain said two phases intermixed and cause them to occupy a common upper portion of said vessel, said agitating means including a spray member positioned above said introducing means for spraying a fluid upwardly in said vessel;
   conduit means for recirculating at least a portion of said two phases, said conduit means withdrawing said portion of said two phases from the upper portion of said vessel and supplying all of said portion of said two phases to said spray member, said spray member being disposed beneath the area from which the said portion of said two phases is withdrawn from the vessel;
   a pump for forcing said portion of said two phases from the upper level of said vessel through said conduit means and spray member to maintain said two phases intermixed;
   separate means beneath said spray member for introducing a fluid at elevated temperature into said vessel;
   means for separately removing liquid from the bottom portion of said vessel; and
   separate means for removing said two phases from the upper portion of said vessel.

2. A separating apparatus as defined in claim 1 wherein said last-mentioned means includes an enlarged funnel-shaped compartment disposed within the vessel with an open upper end located within the upper portion of said vessel, said compartment having a downwardly extending leg of reduced cross section which at its lower end opens to the exterior of said vessel; and
   valve means are provided to control the flow of said two phases to the exterior of said vessel.

References Cited by the Examiner
UNITED STATES PATENTS

| | | | |
|---|---|---|---|
| 1,763,762 | 6/1930 | Crowley. | |
| 2,253,566 | 8/1941 | Klepetko. | |
| 2,753,949 | 7/1956 | Manuel | 55—94 |
| 2,891,675 | 6/1959 | Kaplon | 259—95 X |
| 2,991,987 | 7/1961 | Heinze | 299—7 X |
| 3,007,578 | 11/1961 | Wride et al. | 210—208 X |
| 3,165,466 | 1/1965 | Vautrain et al. | 210—194 X |
| 3,220,706 | 11/1965 | Valdespino | 210—221 X |

REUBEN FRIEDMAN, *Primary Examiner.*

D. M. RIESS, *Assistant Examiner.*